United States Patent [19]

Knowles et al.

[11] Patent Number: 4,688,118
[45] Date of Patent: Aug. 18, 1987

[54] SERVO GAIN COMPENSATION IN A DISC DRIVE

[75] Inventors: Vernon L. Knowles; Roger V. Wilcox; Bruce J. Jackson, all of Boise, Id.

[73] Assignee: Hewlett-Packard Company, Palo Alto, Calif.

[21] Appl. No.: 880,973

[22] Filed: Jul. 1, 1986

[51] Int. Cl.⁴ ............................................ G11B 5/012
[52] U.S. Cl. ...................................... 360/75; 360/77; 360/78
[58] Field of Search ............................. 360/75, 77, 78

[56] References Cited

U.S. PATENT DOCUMENTS 4,115,823  9/1978  Commander et al. ............... 360/77
4,412,165  10/1983  Case et al. ............................ 360/77
4,530,019  7/1985  Penniman .............................. 360/77
4,551,776  11/1985  Roalson ................................. 360/77
4,588,636  5/1986  Shirahata ............................. 428/336

Primary Examiner—George G. Stellar
Attorney, Agent, or Firm—William J. Bethurum

[57] ABSTRACT

Improvements are realized in magnetic disc drives in minimizing servo gain variations from one head to another and in differing track offset positions by providing servo code patterns and methods of fabricating such patterns in which magnetic heads of differing widths overlap the same amount of servo code and in which servo gain variations in track offset positions are minimized by maintaining servo code overlap by the magnetic heads relatively constant up to substantially one-half track offsets of magnetic head.

22 Claims, 24 Drawing Figures

SERVO GAIN COMPENSATION IN A DISC DRIVE

TECHNICAL FIELD

This invention relates to arrangements for servo gain compensation in a magnetic type of disc memory drive or file, and, more particularly to such a disc drive in which the discs have servo magnetic transitions or zones recorded thereon of individual configurations and overall patterns of such configurations, affording substantially uniform headto-head as well as media servo gain characteristics.

BACKGROUND ART

Magnetic disc drives use magnetic heads and recorded servo code in a track following servo mode for keeping the magnetic heads track centered during reading operations. The magnetic heads comprise a magnetic core having an air gap therein and having a coil wound thereon. These magnetic cores vary in effective magnetic widths due to their design and due to the manufacturing process. These physical variations among the magnetic heads result in variations in servo gain when they are individually connected in the servo loop. Efforts to compensate for these variations in servo gain have included manual adjustments of servo gain of the individual heads in the servo loops and arrangements for automatically compensating for such variation which latter are made in the circuits coupling the individual heads to the servo system.

Such arrangements usually involve, individually calibrating the heads, determining the correction to bring all of the heads within a predetermined servo gain band width and externally storing the individual corrections which are to be made to compensate the servo gain variation with different heads. These approaches however, do not suggest the use, on the memory discs, of servo code patterns which are designed to compensate head-to-head servo gain variations, to compensate servo gain variations resulting from the radial position of the individual heads on the discs and to compensate servo gain variations resulting from the aerodynamic behaviour of the individual heads in flight.

Along this line, U.S. Pat. No. 4,412,165 describes a sampled servo position control system. Here servo codes provided at intervals on a record medium are used in a sampled servo system to define data tracks. The patent notes that problems arising from the magnetic medium or from the servo writing process can in some instances lead to misalignment of a servo path or track defined by the servo code with a corresponding desired data track. The problem is solved by measuring the position error signals with a head constrained in the correct on-track position. These position error signals are stored in the disc data section immediately preceding the associated faulty sample and used to keep the head on track with the data.

While recording on the disc is described to store information to correct this off-track problem, there is no consideration with regard to specific configurations of magnetic zones or patterns of such configurations of magnetic zones for achieving uniform servo gain.

There is one patent known to the applicants, however, that does refer to the use of the magnetic media for compensating servo gain variations. This is U.S. Pat. No. 4,530,019. Here a code pattern, useful in providing data to a processing scheme to control the fine positioning of a transducer head of a disc drive unit, comprises an erased gap followed by an automatic gain control information code burst followed by a first burst of servo control information code followed by a second burst of servo control information code. Mechanical indexing is used in writing this code. Rotation of the disc is used as a primary time reference with all other time references being based on a transition between the erased gap and the automatic gain control burst. The servo control information bursts are written alternately off track by one half of the track separation between the track of interest and the next adjacent track to each side thereof. The pattern is decoded using a comparator circuit and an integrator. The decoded information being used to center the transducer over the track.

Although the AGC information is stored on the disc it is only an automatic gain correction for that particular head and is not a servo code pattern which together with other servo code patterns in different tracks across the disc result in relatively uniform servo gain for that particular head at any location on the disc.

U.S. Pat. No. 4,588,636 is directed to a magnetic memory disc which has controlled magnetic characteristics in the radial direction achieved by controlling the thickness and composition of the magnetic layer which is formed on the disc. The procedure for forming such a disc coating is described in the patent and involves an electroplating operation.

Specific servo codes for achieving relatively uniform servo gain with a particular head at any location radially of the disc are not discussed.

DISCLOSURE OF THE INVENTION

This invention provides a new approach to servo gain compensation in a magnetic disc drive by providing write pattern and write width variations in servo code to minimize head-to-head and media dependent servo gain variations. In a presently preferred embodiment of this invention, multiple writing of a single magnetic transition or zone together with erasures of portions previously written transitions, using a specific head for writing of the servo code, is used to achieve servo code recordings which when read by the head used for recording results in minimum headto-head and media induced servo gain variations. The write patterns may be single write (single stroke), exclamation or dash-dot write (exclamation sign), colon write (two dashes in a line), and dot-dash-dot write in a line.

Write current, empirically determined, may also be varied, if needed, as the write head is moved across the disc to compensate the change in magnetic coupling between the head and the magnetic surface of the disc with the relatively uniform variation of the space between the head and the disc surface between the outer and inner tracks.

This approach to servo gain control does not require external drive electronics as do the prior art arrangements discussed above. Using the approach of this invention, the servo gain does not depend upon head width. The heads have a wider, linear, track off center displacement range and all the heads can be made to overlap the same amount of servo code from the widest to the narrowest possible head within the manufacturing tolerance limitations. Head-to-head and head-to-track calibration and the determination of servo gain corrections are minimized, as are correction storage requirements on the disc or in external circuits together with circuits for addressing such corrections with each head and track selection.

BEST MODE FOR CARRYING OUT THE INVENTION

Figure 1:
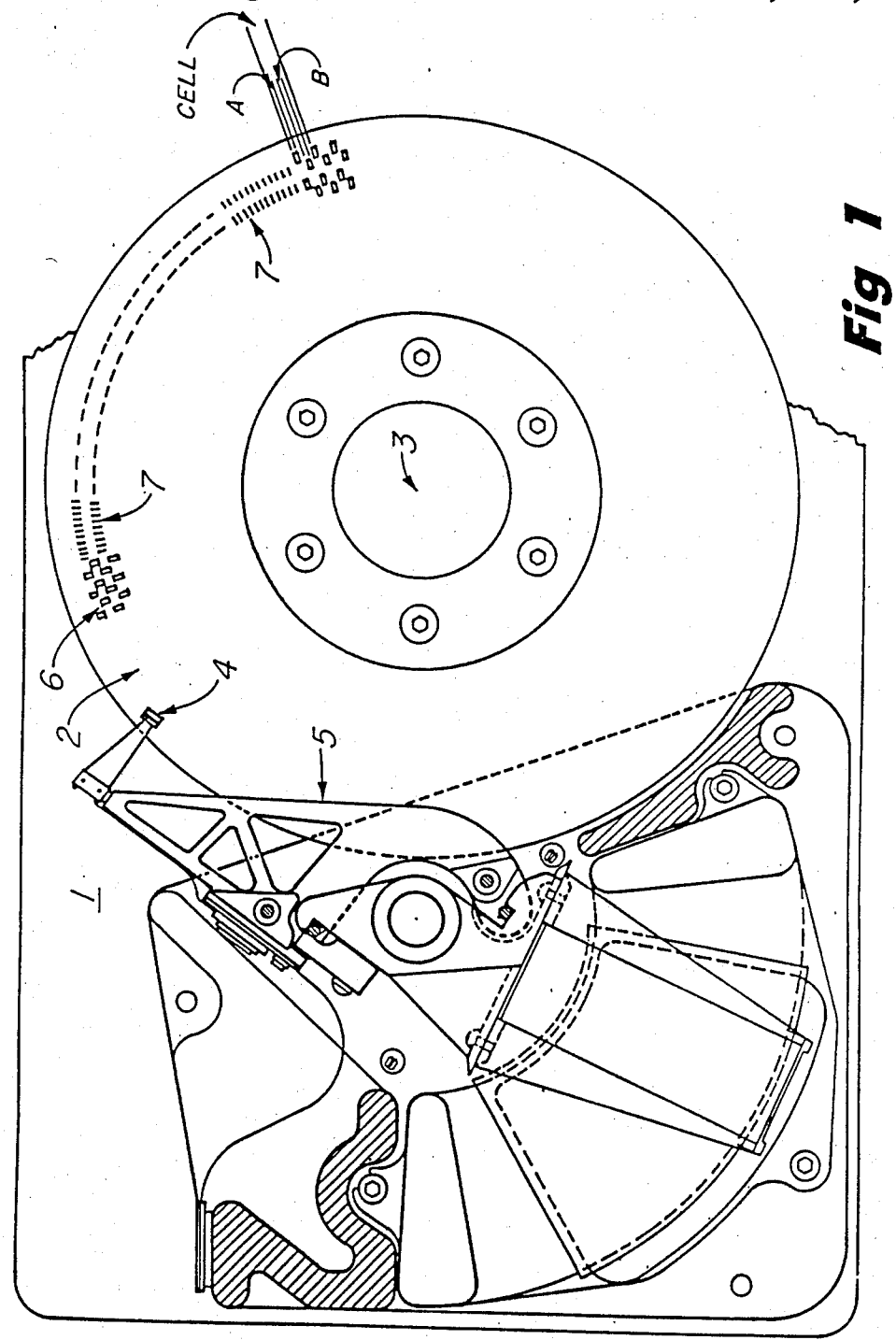
FIG. 1, is a plan view of a disc drive.

This invention is employed in a magnetic disc drive or file 1 which typically comprises a plurality of memory discs 2 which are axially spaced along a disc spin axis 3 in a parallel plane array. The disc surfaces are scanned by individual magnetic heads 4 which are used for writing and reading servo code and data code in concentric tracks. These heads are flexibly supported from one end of a movable head carriage 5, here shown as a rotary actuator, which moves the heads as a unit in an arcuate path over the disc surfaces.

In operation the magnetic heads each literally fly above the adjacent surface of the spinning discs on the thin film of air clinging to the surface of each of the spinning discs. Such an arrangement is known in the art.

Two phases of servo code 6 are recorded in bursts on the tracks in the data code fields 7 on the discs. The heads are individually, selectively connected in a servo loop for reading or writing, and position error signals from a head in scanning the servo code when reading are used by the servo for track centering the head.

The two phases of servo code are designated A and B. The magnetic zone of phase A is recorded on one side of a track and the magnetic zone of phase B is recorded on the opposite side of that track. Phases A and B are circumferentially spaced within a cell as shown. All magnetic zones of phase A are aligned across the disc as are all of the magnetic zones of phase B. With a rotary actuator, alignment is along an arc described by the magnetic heads scanning the tracks. With a linear actuator, alignment is along a radius. The magnetic zones are recorded using recording fields called as the A field and the B field, hereinafter.

Three types of magnetic heads are presently available for use in magnetic disc drives. These are known as the monolithic, the composite and the thin film magnetic heads. Each comprises a body having sliders for riding upon the disc surface at low disc surface speeds. The body carries a magnetic core having an air gap disposed adjacent the disc face. A coil inductively coupled to the magnetic core produces a magnetic field at the air gap which is used for writing servo and data codes. During reading, voltage is induced in the coil.

Figure 2:
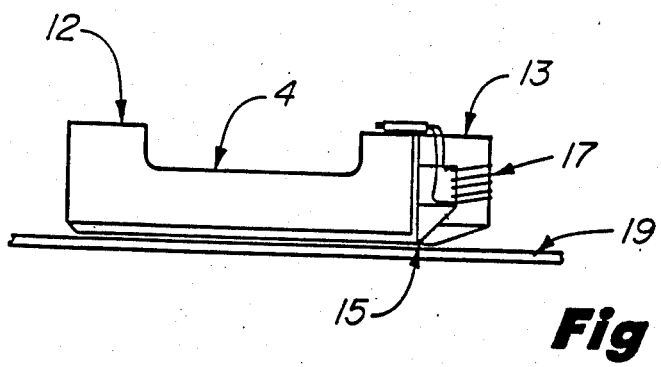
FIGS. 2, 3 and 4 are side, botton and rear views, respectively, of a typical magnetic transducer head.
Figure 3:
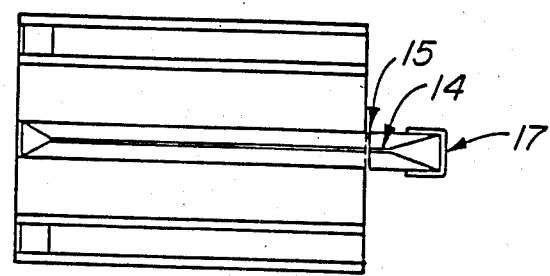
Figure 4:
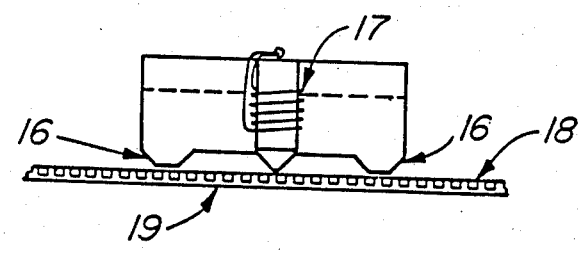

As seen in FIGS. 2, 3 and 4, the magnetic head 4 comprises a body portion 12 and an electromagnetic device 13. The magnetic core of the electromagnetic device 13 may be an integral or separately attached part of the body 12. The bottom pole face 14 of the magnetic core (FIGS. 3 and 4) is of a width corresponding to the width of a magnetic zone. An air gap 15 is provided in the bottom pole face of the magnetic core. A coil 17 is wound about one leg of the magnetic core. The magnetic head is used for writing or for reading servo and data code on a magnetic disc surface.

The bottom face of the body 12 at its lateral edges is provided with integral sliders 16 having smooth faces which engage the disc surface and ride the disc surface during disc spin up and spin down periods.

In operation the magnetic heads each literally fly above the adjacent surface of the spinning discs. The surface speed of the disc varies between the outer and inner track radii being greater at the outer radius. Thus the head spacing from the disc surface on the slower moving air cushion at the inner radius is less than the head spacing from the disc surface at the outer radius.

FIG. 4 illustrates the magnetic head as viewed from the rear in a position spaced slightly above a magnetic disc 19 having magnetic zones or transitions 18. As seen in FIG. 3, and in FIG. 4, the magnetic core has a V-shaped bottom section, the flat bottom edge of which defines the pole face 14. The width of this pole face is approximately the width of, or slightly less than, the width of a track. When used for writing servo or data code, the coil 17 is energized in a manner to provide the magnetic field for recording the desired magnetic transitions or zones in the disc surface.

The characteristics of the magnetic field at the air gap are well known and understood. The surface of the disc is uniformly magnetized in one direction. Writing of the servo code involves establishing magnetic zones having leading and trailing edge transitions. The magnetic zones are of a magnetic polarity opposite that of the disc surface. Normally the coil 17 carries a constant current producing a constant magnetic field at the air gap 15 which is magnetically poled to correspond to the magnetization of the disc surface. Magnetic zones are written by changing the coil current in one sense at the leading edge transition and changing the coil current in an opposite sense at the trailing edge transition. The sense of these current changes being such as to produce the oppositely poled magnetic zones in the disc surface. Fringing flux at the side edges of the pole face 14 is a factor to be considered in such recording operations, as will be seen.

Although magnetic heads are manufactured to close dimentional tolerances, there are dimentional differences among the heads. These dimentional differences result in head-to-head servo gain variations which require correction. The design width of a typical magnetic head may be 450 μin. across the pole face. The tolerance in this dimension may be ±75 μin. The fringe magnetic field may add 100 μin. Track to track spacing with such heads equals 650 μin. With these dimensions, the width of the wide head equals 450+75+100 which equals 625 μin. A narrow head has a width which equals 450−75+100 which equals 475 μin. The difference in these width dimensions is 150 μin., which is significant. The resulting servo gain variations from head width variations alone require correction.

SERVO CODE

Figure 5:
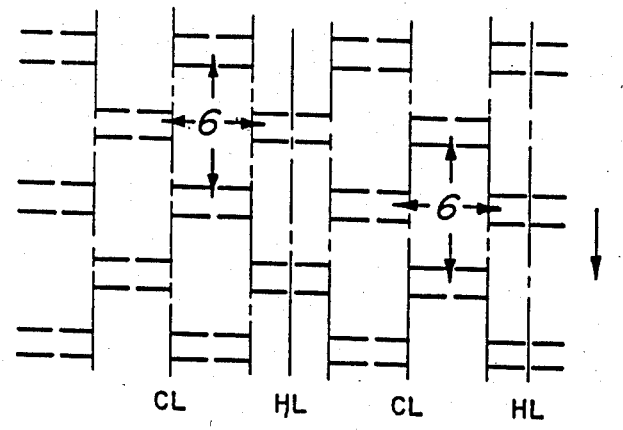
FIGS. 5, 6 and 7 illustrate differing servo code patterns, respectively.
Figure 6:
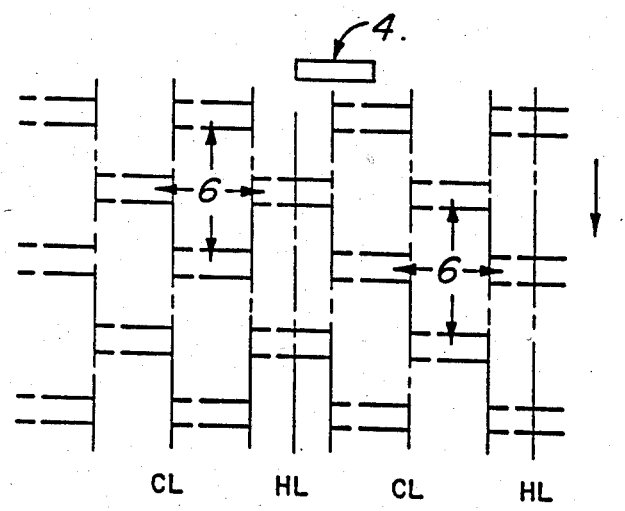
Figure 7:
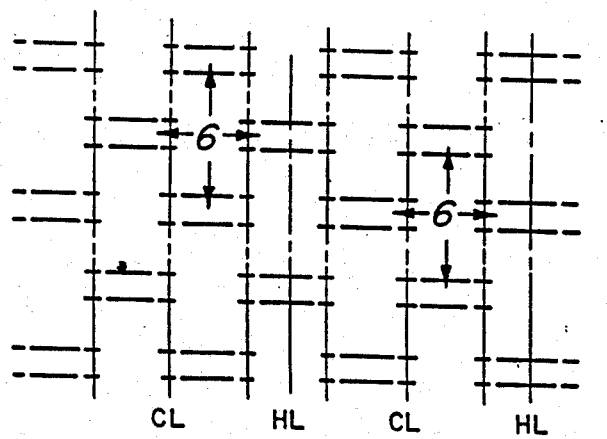

Servo code patterns and methods of generating such patterns are described herein. These patterns are configured so that the wide and the narrow magnetic heads ideally overlap the same amount, or substantially the same amount, of servo code and thus exhibit the same or substantially the same servo gain when coupled in the servo loop. FIGS. 5, 6 and 7 illustrate servo code patterns having differently configured magnetic transitions or magnetic zones. In FIG. 5 the opposite circumferentially spaced edges of the magnetic zones are defined by two dash lines. In FIG. 6, the opposite circumferentially spaced edges of the magnetic zones are defined by the dot-dash lines, and, in FIG. 7 the opposite circumferentially spaced edges of the magnetic zones are defined by the dotdash-dot lines.

Movement of a magnetic head 4 with respect to the surface of a disc having these servo code recordings, is represented by the arrows adjacent each of the figures. In FIG. 6, a magnetic head is depicted by the rectangle 4. Its width corresponds closely to the width of a magnetic zone. The magnetic head 4 is shown in a track centered position. As the magnetic head 4 traverses the magnetic zones in FIG. 6 in track centered position, the voltages induced in the coil in traversing each zone are equal. Thus the voltage difference, which is zero, indicates the magnetic head is track centered. If the magnetic head were displaced to the left or to the right as viewed, the voltage induced in the coil 17 would be greater as the head passes over that magnetic zone having the greater overlap of the head. The difference in the induced voltages now indicates the direction and the amount of track offset.

The gaps in the lines defining the leading and trailing edges of the magnetic zones are the result of side erasures, due to the fringe fields, in writing the servo code. In developing the servo code, it is desirable to provide maximum overlap of the code by both the wide and narrow magnetic heads. It is desirable to have the same overlap of the magnetic zones for both the wide and the narrow magnetic heads and to have a wide linear range of overlap in track offset positions. It is further desirable to avoid having side erasures in the magnetic zones near the outer edges of the magnetic heads as would be the case in FIG. 5, for example, since this can result in a servo gain characteristic with the head on track center which tends to be erratic. Rather it is desired that side erasures be as near the track center as possible, as in FIG. 6 or in FIG. 7. The magnetic heads are less sensitive to side erasures when they are near the center of the magnetic head. It will be appreciated from reviewing these figures that the edges of the magnetic zones defining the track centers may be recorded that they overlap to some extent, in which case the track centers bisect the overlap. The width of the magnetic zones of course in this situation would be greater than that indicated to maintain the same track center line spacing, as will be described. In the situation where overlapping of the side edges of the magnetic zones exists, it will be apparent that the magnetic head 4, when track centered, will overlap equal parts of the magnetic zones.

SERVO CODE PATTERNS

FIGS. 8–18 illustrate servo code patterns and the following specification describes methods for writing such servo code patterns so that the servo gain is minimally affected by magnetic head width. Excepting for FIG. 16, these figures are developed in pairs. One servo code pattern for a wide head and a second similar servo code pattern for a narrow head.

In all of these figures, the surface of the disc is represented by the surfce of the paper and is of one magnetic polarity. The rectangles show areas of the opposite magnetic polarity. These rectangles represent magnetic zones. For drawing convenience, the patterns of these magnetic zones have been drawn so that what is actually an arc of a circle on the disc appears as a straight line across the paper. Radial displacement from the center of the disc occurs along parallel lines between the top and bottom of the paper in these figures, rather than along radial or arcuate lines. The center of the circle for consistency is assumed to be at the bottom of each of the figures. The drawings are to be interpreted with these considerations.

Relative head motion in scanning the surface of the disc in the individual tracks is from left to right as viewed. The surface of the disc is divided into magnetic cells. As described in connection with FIG. 1, there are two phases of servo code in each cell. One is the A phase comprising the A magnetic zones and the other is the B phase comprising the B magnetic zones. These respective magnetic zones are written by what is termed an A field and a B field. These fields are identical and produce identical magnetic zones which are 180° apart in the period defined by each cell. Track center lines are identified as N, N+1, N+2, N+3, and so forth. Half line tracks are defined by the track center line identifications defining the half line track boundaries. For example, N, N+1; or N+1, N+2; and so forth. The head that is used to write the servo code on a disc surface is also used to read that servo code.

Figure 17:
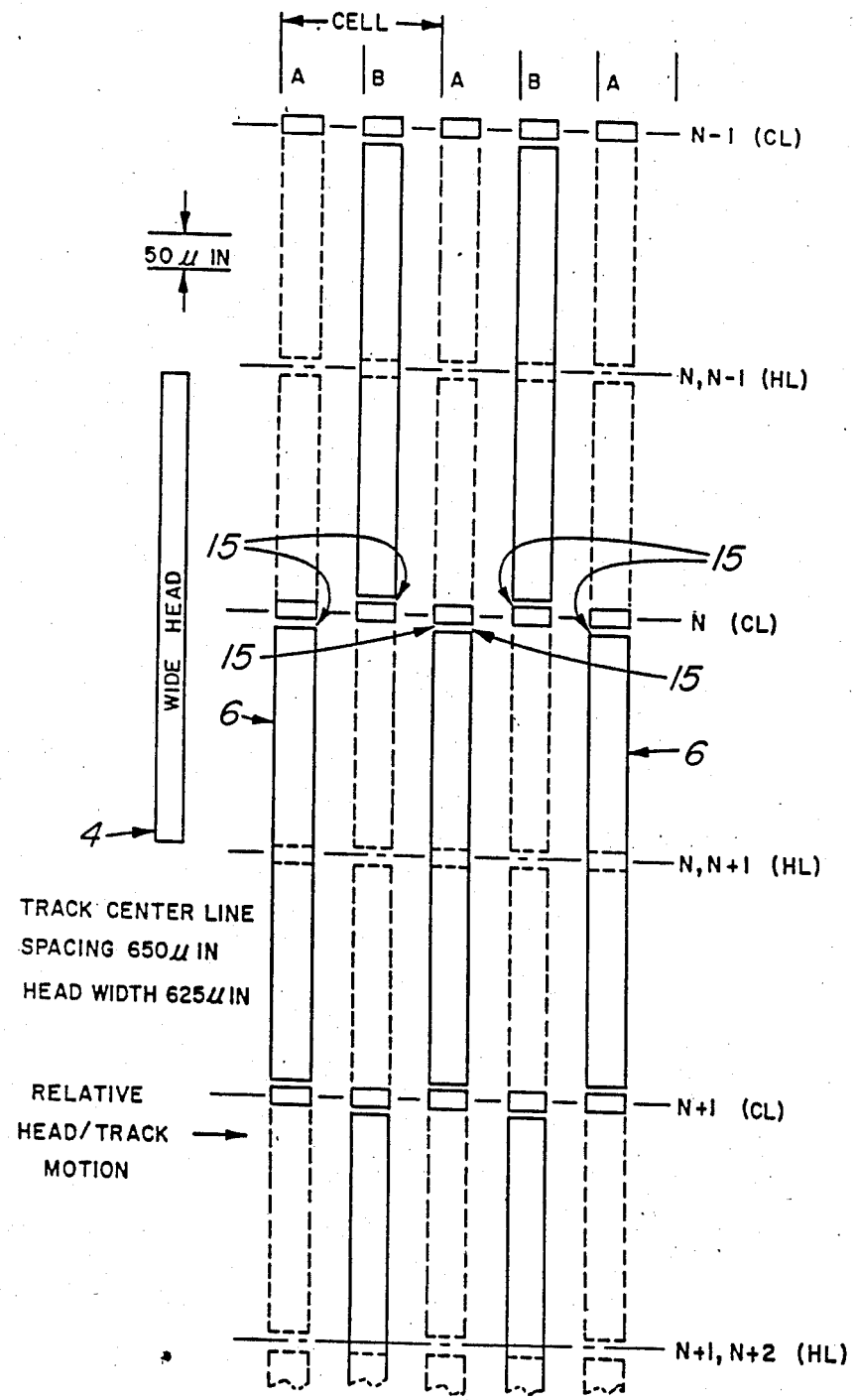
FIGS. 17 and 18 illustrate the proportions of the servo code patterns based upon the dimensions of the widest and narrowest widths of a typical magnetic head, using the recording technique of FIGS. 14 and 15, respectively.
Figure 18:
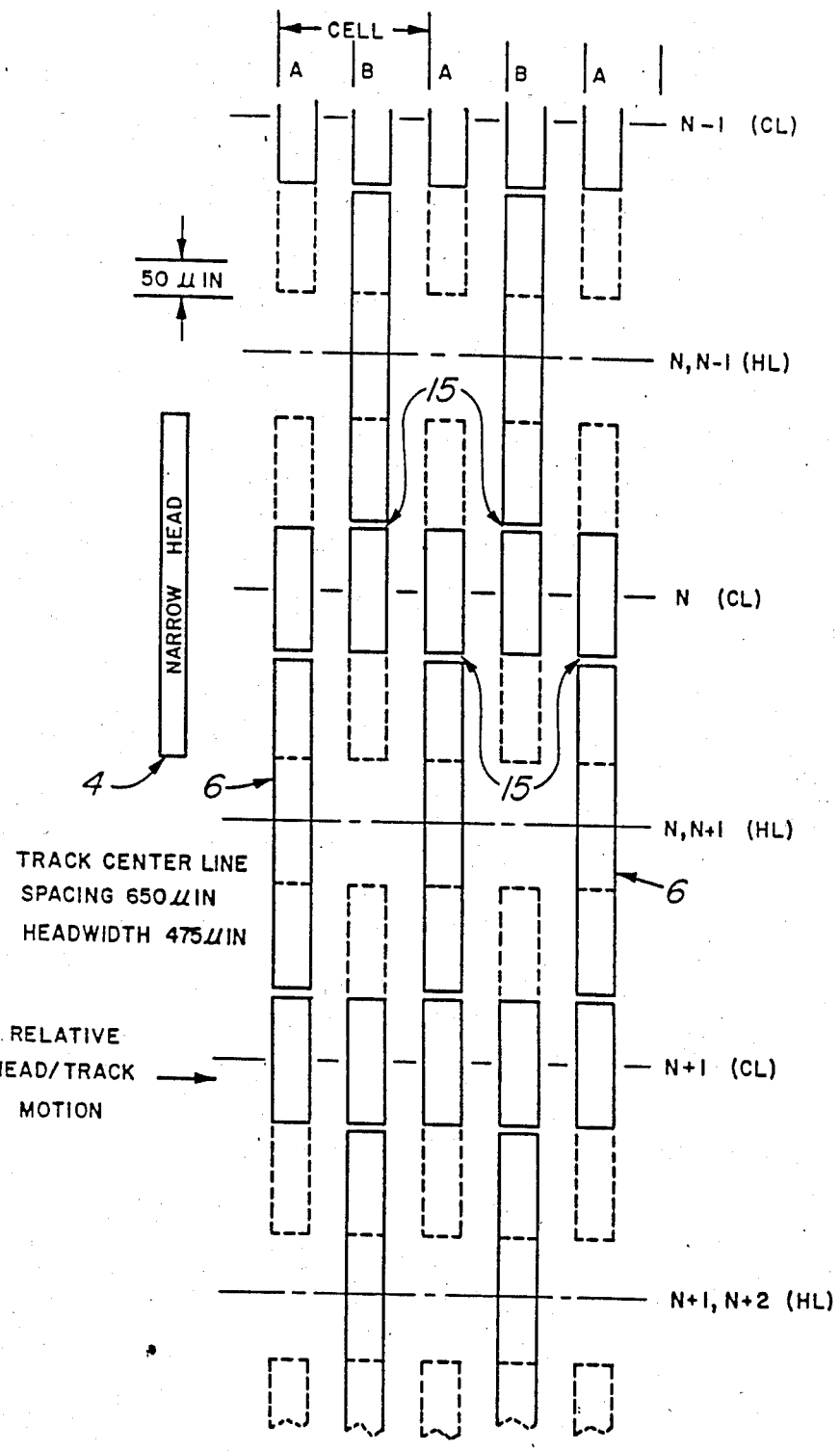

The dimensions of the magnetic head used in writing the servo code in FIGS. 8 through 16 are arbitrary. However, the same dimensions for the wide heads as well as the narrow heads are used throughout these figures so that comparisons of the servo code patterns are easily made. FIGS. 17 and 18, however, use wide and narrow magnetic head dimensions for an actual magnetic head and therefore provide a representation of an actual servo code pattern for an actual track spacing when the servo code is written using the wide and the narrow heads, respectively.

Figure 8:
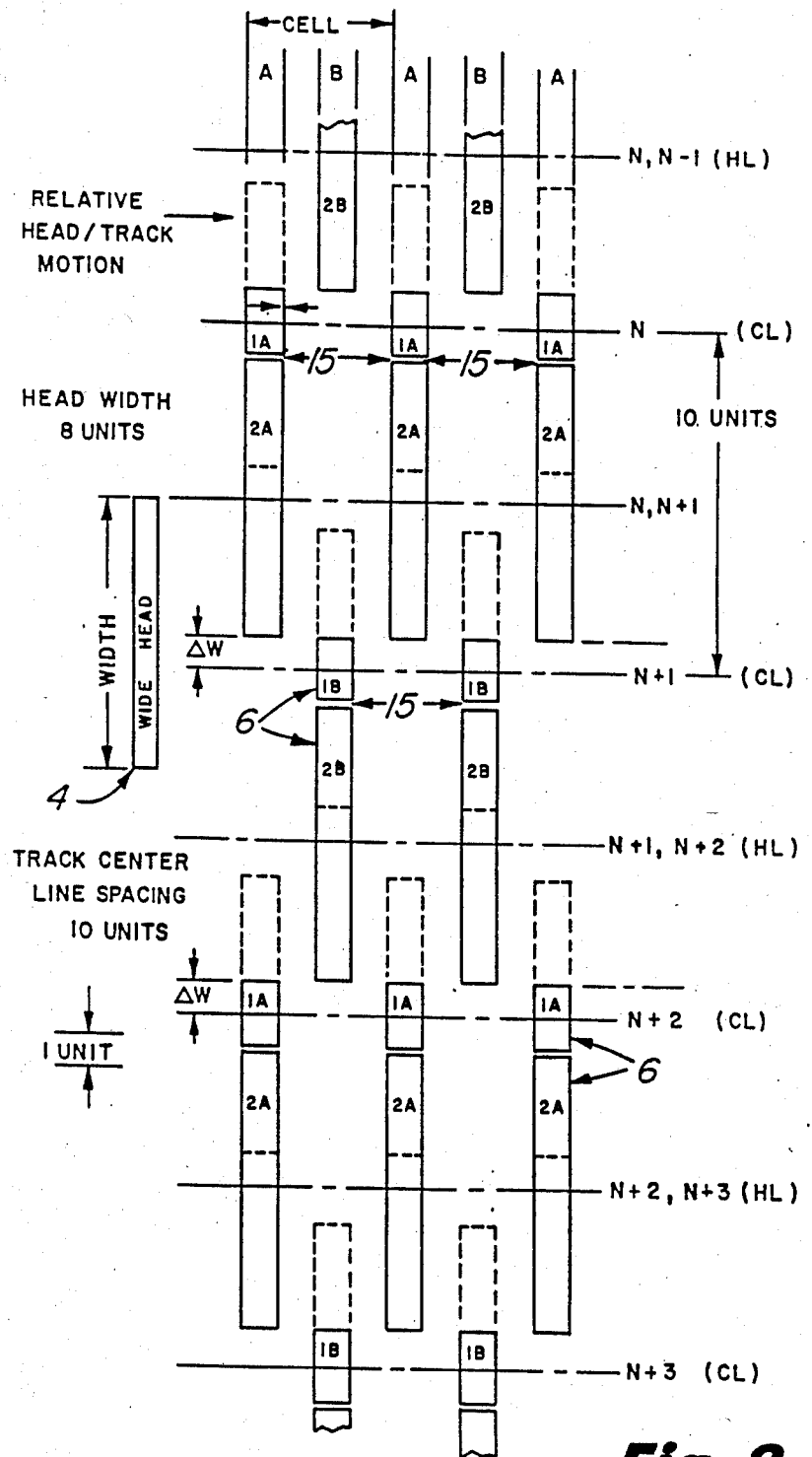
FIGS. 8 and 9 are servo code patterns written with wide and narrow heads, respectively, in which the side erasures for the wide magnetic head are near the track center and for the narrow head are beyond the sides of the narrow head.
Figure 9:
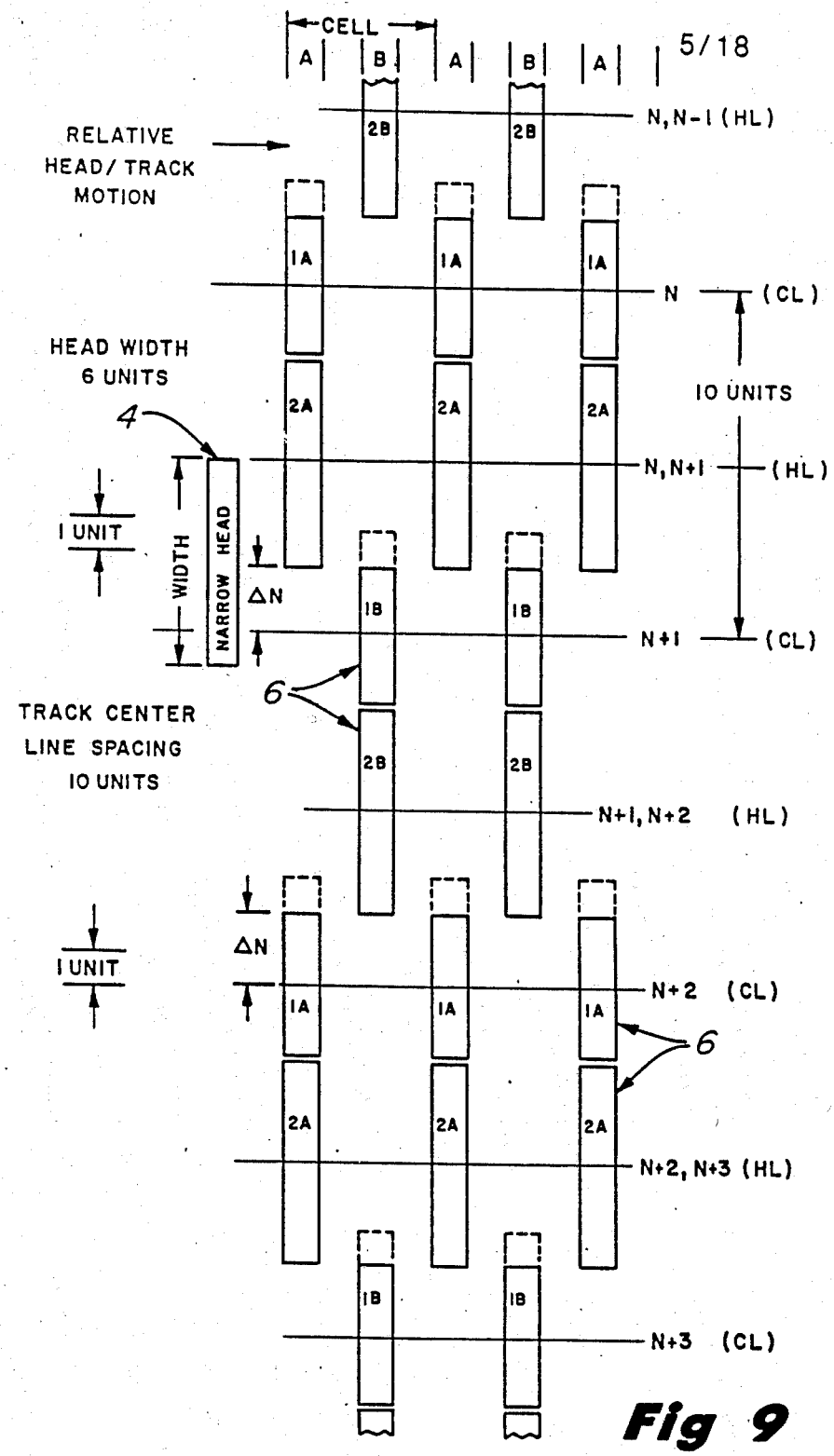

FIGS. 8 and 9 illustrate servo code patterns of the type of FIG. 6 above. The servo code of FIG. 8 is written with a wide head and the servo code of FIG. 9 is written with a narrow head. The method of writing this servo code is set forth herebelow.

First write on track center lines.
1. Write center line track N with field A.
2. Write center line track N+1 with field B.
3. Write center line track N+2 with field A.
4. Continue this sequence for as many center line tracks as required.

Now go back and write half lines using fields A and B.
1. Write half line track N, N+1 with field A.
2. Write half line track N+1, N+2 with field B.
3. Write half line track N+2, N+3 with field A.
4. Continue this sequence with as many half line tracks as required.

In FIGS. 8 and 9, the magnetic zones 6 are written on the center line tracks N, N+1, N+2, and so forth, are identified 1A and those written on the half line tracks thereafter are identified 2A. Likewise the magnetic zones are written with the B field on the center line tracks are identified 1B and those written with the field B on the half line tracks are identified 2B. The dotted line outlines of the magnetic zones in FIGS. 8 and 9 (and in the figures which follow) represent the extent of the original magnetic zone as written on the center line tracks with the A and B fields. The dotted line extensions of the magnetic zones 1A and 1B on the upper side of those remaining magnetic zone sections represents that portion of the original magnetic zone which was erased at the time that the magnetic zones were being written, on the half lines, as described hereinabove.

In writing the magnetic zones, the write head is energized with a steady state current producing a magnetic field poled in the same sense as the magnetic field of the disc surface. This current is then switched to the opposite polarity at the leding edge of the magnetic zone to be written and at the trailing edge of the magnetic zone is switched to its original polarity. As the write head in its normal steady state condition, producing the magnetic field which is poled in the same sense as that of the disc surface, passes over a part of a previously written magnetic zone, it erases that portion of the previously written magnetic zone which is within its magnetic field. Thus the magnetic zones 1A are clipped, or erased to a position above each of the center lines N and N+2, for example, approximately at the edge of the write head, in the process of writing the magnetic zones using the field B on the half line positions. When the magnetic zones 2A are being written the magnetic zones 1B are similarly erased as seen at the tracks N+1 and N+3 for example. When the half line magnetic zones 2A and 2B are written they are written exactly inphase respectively with the magnetic zones 1A and 1B and overlapping the magnetic zones 1A and 1B to the extent indicated by the dotted lines in each of the magnetic zones 2A and 2B. The fringe field at the side of the magnetic head overlapping the original magnetic zones, erases a small section of the original magnetic zone as indicated at 15 for example. This is referred to as a side erasure or splice and is at a position below the track center lines N and N+1 and so on, in each figure, which is substantially the same as the position of the upper edge of each of the magnetic zones 1A and 1B above the track center line, to provide magnetic zones which are essentially symmetrical with respect to the center lines.

As will be observed by comparing the magnetic zones 1A and 1B of FIGS. 8 and 9, the magnetic zones 1A and 1B are wider when produced by the narrow head than they are when produced by the wide head. The track center lines are defined between the ends of the magnetic zones 1B and 2A and 1A and 2B. This results in a center line shift designated $\Delta$ W in FIG. 8 and $\Delta$ N in FIG. 9. It will be observed that this center line shift resulting from writing with the wide head is less than the center line shift resulting from writing with the narrow head. Each of the wide and narrow magnetic heads are depicted in positions centered with respect to these displaced center lines, which is the position each occupy when track centered in normal use.

Since only one magnetic head is in the servo loop at a time, this offset in track center lines does not pose a problem when both track seeking and centering is done with the individual heads, and in any case can be minimized.

Side erasures such as those at locations 15 in FIGS. 8 and 9, for the wide head are near the center of the head and for the narrow head are beyond the side edges of the head. Thus limited lateral excursions of these heads to one side or the other of a track centered position does not result in significant changes in servo gain during operation. There is, however, a small variation in servo gain from head to head since the heads overlap different amounts of the magnetic zones defining the servo code.

Figure 10:
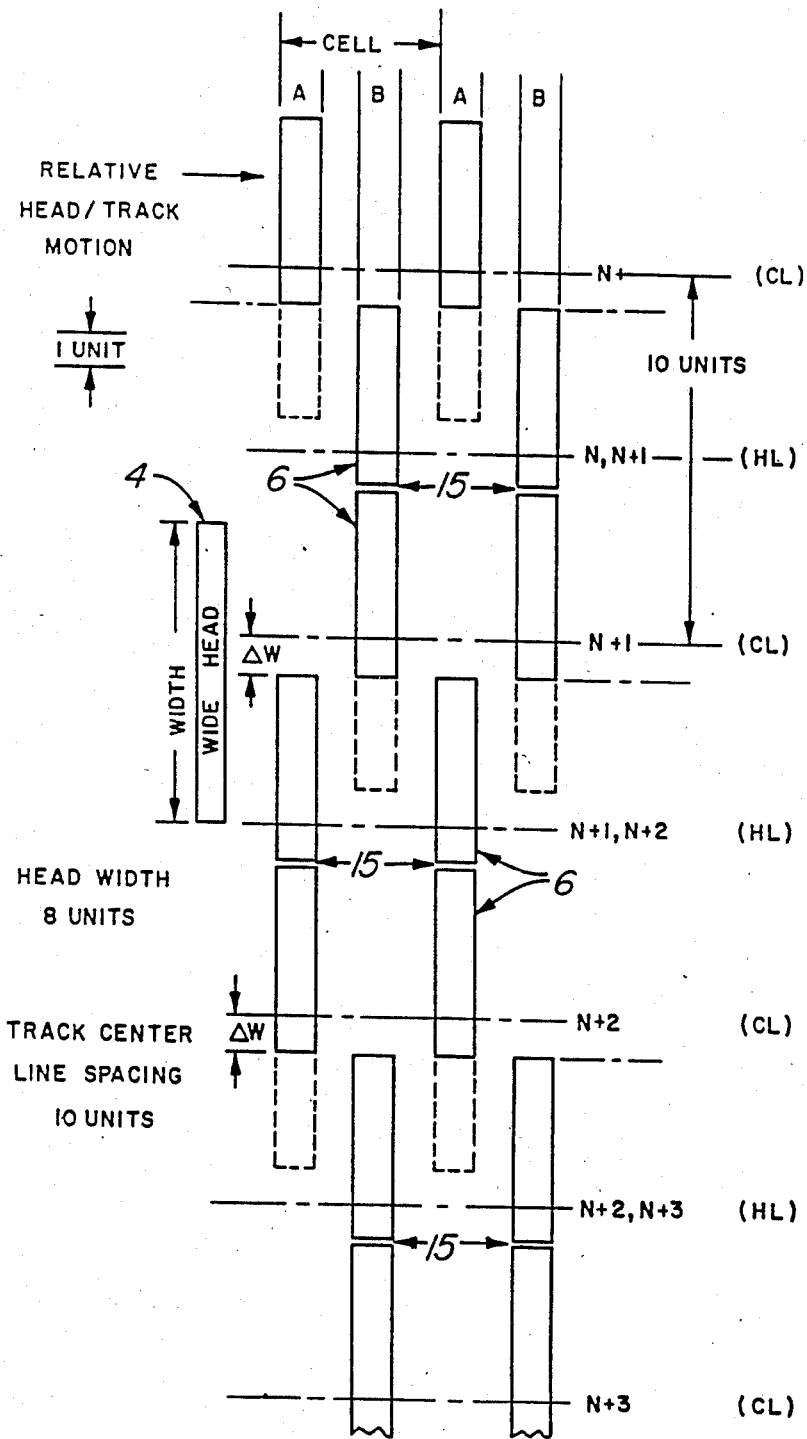
FIGS. 10 and 11 are servo code patterns written with wide and narrow heads, respectively, on half track steps in sequential order across the magnetic disc.
Figure 11:
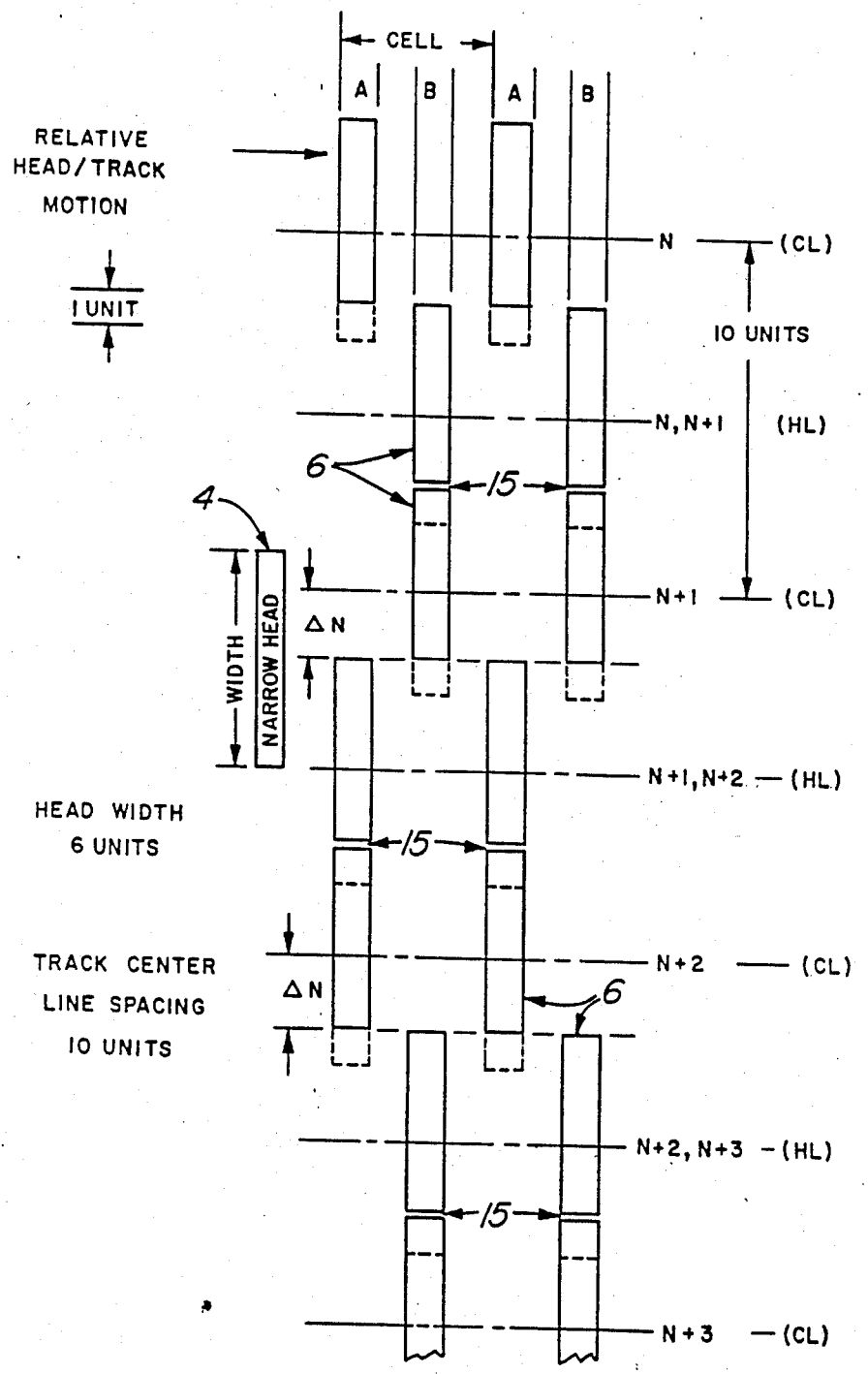

FIGS. 10 and 11 provide a different servo code pattern in which the side erasures 15 in the magnetic zones 6 are outside of the side edges of both the wide and narrow magnetic heads. As in the case of FIGS. 8 and 9 the offset of track center $\Delta$ W and $\Delta$ N, for the wide and narrow heads, respectively, is less for the wide head than for the narrow head. This pattern corresponds to FIG. 5. The method for formatting this servo code pattern is as follows.

1. Write the center line track N with field A.
2. Write the half line track N, N+1 with field B.
3. Write the center line track N+1 with field B.
4. Write the half line track N+1, N+2 with field A.
5. Write the center line track N+2 with field A.
6. Write the half line track N+2, N+3 with field B.
7. Write the center line track N+3 with field B.
8. Continue writing in this sequence until the required number of tracks have been written.

Here again, the dotted lines indicate the original extent or width of the respective magnetic zones A and B. For example, on track N the bottom sides of the magnetic zones A, which are first written, are partially erased, as indicated by the dotted outline, with recording of the magnetic zones B on the half track N, N+1. Using the magnetic field B to write the magnetic zones B on the center line N+1 overlaps the magnetic zones B written by the B field on the half line track N, N+1, resulting in side erasures or splices 15 in the magnetic zones on the half track N, N+1. The extent of overlap is indicated by the dotted lines across the magnetic zones recorded on the center line N+1. Similar considerations apply with respect to the magnetic zones A written on the half lines N+1, N+2 and the center line N+2. In FIGS. 10 and 11, the magnetic heads are shown centered with respect to the displaced track center lines, which is the position they would occupy when track centered in normal use for reading the servo code. This approach to writing the servo code simplifies the recording procedure in that writing takes place in half track steps which is easily programmed in the sequential displacement of the write head.

As explained in the case of FIGS. 8 and 9, the track center line offset does not pose a problem in reading the servo code. However, here again, the heads overlap a different amount of servo code and thus there is a slight, though not significant, difference in servo gain between the wide and the narrow head. The linear range of servo gain with track offset is greater with the narrow head than it is with the wide head before a side erasure is encountered.

Figure 12:
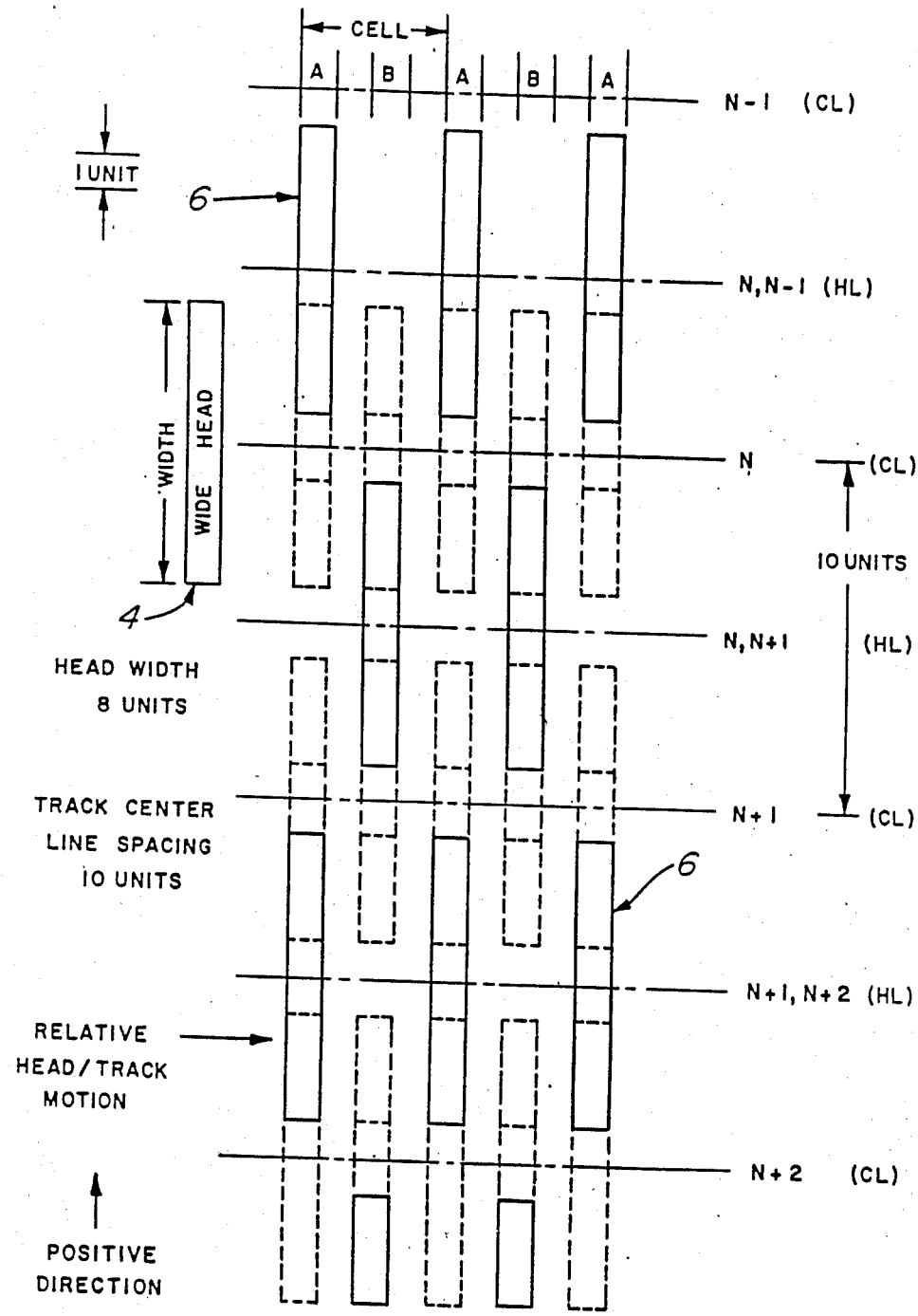
FIGS. 12 and 13 are servo code patterns written with wide and narrow heads, respectively, in which previously written magnetic transitions are trimmed using an off track head displacement determined from the narrowest head.
Figure 13:
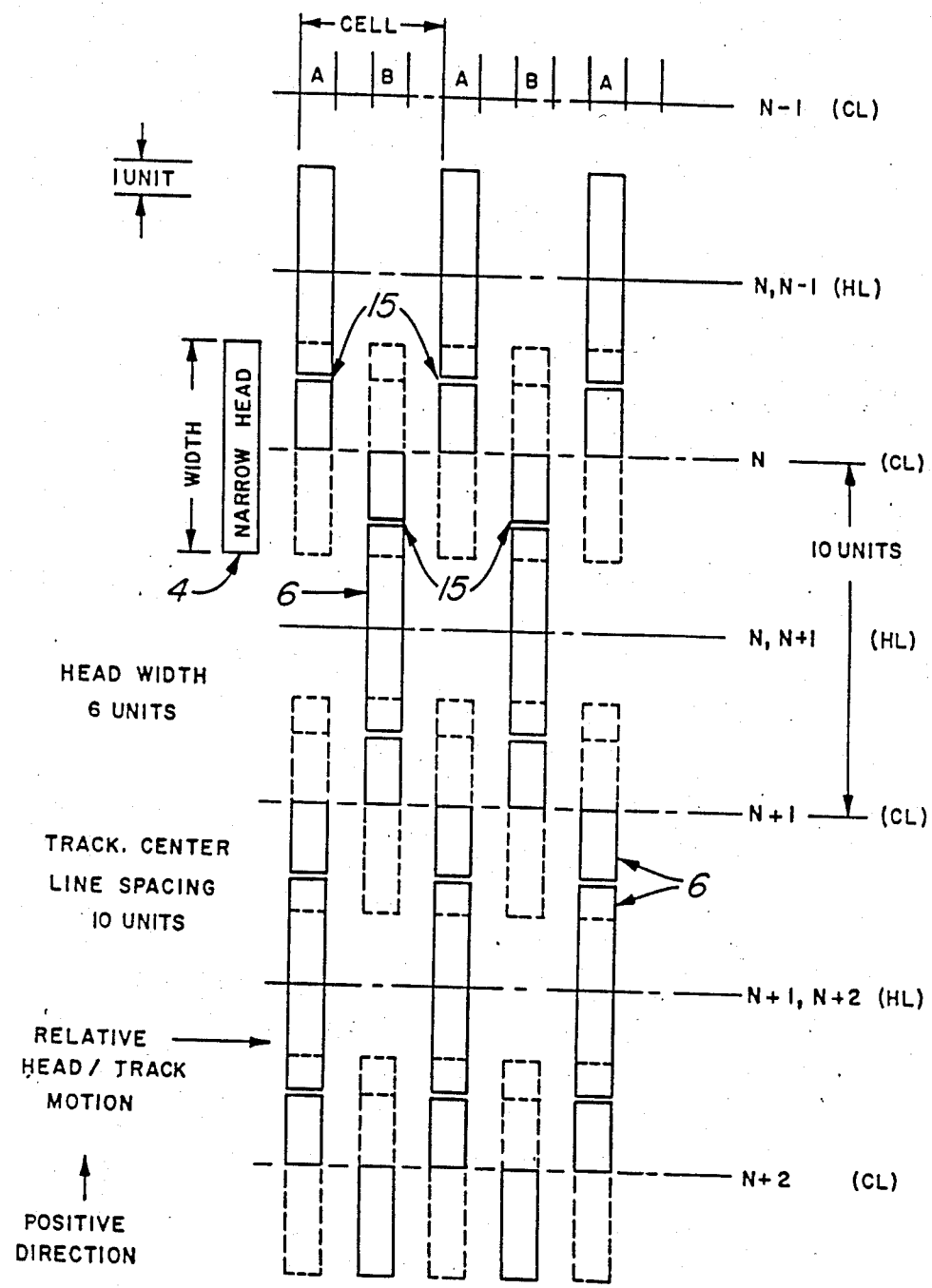

Improvements are provided in the servo code patterns of FIGS. 12 and 13 for wide and narrow magnetic heads respectively. These improvements minimize the difference in servo gain between the wide head and the narrow head and provide a wider linear range of servo gain as a function of track offset of the magnetic heads. This is accomplished by a servo code pattern which is overlapped the same amount by the wide head and the narrow head. With this pattern the servo code overlap is the same for both heads in track centered position and remains the same in all track offset positions up to the point where one side of the magnetic head (FIG. 12) no longer overlaps one of the A or B magnetic zones. This occurs in situations where there is a gap between the sides of the magnetic zones at the track center.

The track spacings, as before, are the same for both the wide and narrow head. The requirement, restated, is that all heads when track centered desirably overlap the same amount or substantially the same amount of servo code as the narrowest possible head. If the center-to-center track spacing is assumed to be 10 units and the width of the narrowest head is assumed to be 6 units, then a track offset constant, $\Delta = (W_n/2)$, where $W_n$ is the width of the narrow head, is used in locating the magnetic head. Thus, the track offset constant for recording this servo code pattern, expressed in the drawing units, is $\Delta = 3$.

In recording this servo code pattern, provision is made to "trim" (by erasing) part of an earlier produced magnetic zone. This is accomplished with the head in the $\Delta = \pm 3$ position by switching head current to erase one magnetic zone and skip the other.

The recording sequence for each track is as follows:
1. Write both magnetic zones A and B on one track center line, say the track center line N.
2. Using field A, write magnetic zones A and erase overlapping sections of magnetic zones B on the half line track N, N−1 above the track center line N.
3. Move the magnetic head 3 units above the track center line N. Trim the magnetic zones B and skip the magnetic zones A.
4. Move the magnetic head 3 units below the track center line N. Trim the magnetic zones A and skip the magnetic zones B.

Now move the magnetic head to the center line track N+1.
1. Write both of the magnetic zones A and B on the track center line N+1.
2. Move the magnetic head to the half line track N, N+1. Write magnetic zones B and erase overlapping sections of the magnetic zones A.
3. Move the magnetic head to a position 3 units above the track center line N+1 and trim the overlapping portions of the magnetic zones A, skipping the magnetic zones B.
4. Move the magnetic head to a position 3 units below the track center line N+1 and trim or erase the overlapping sections of the magnetic zones B, skipping the magnetic zones A.

This entire sequence is repeated continuing with N+2 and repeating the sequence recited with respect to center line tracks N and N+1.

By using the writing head to trim the A and B magnetic zones, the wide and narrow heads as well as any of those in between will overlap the same amount of servo code and, hence, have the same servo gain. In short, the head corrects for its own width.

This is evident in FIGS. 12 and 13 which are drawn to the same scale. The unit of measurement is indicated in each of these figures. Track spacing in both cases is 10 units. The head width in FIG. 12 is 8 units and the head unit within FIG. 13 is 6 units. The side edges of the magnetic zones in FIG. 12 with respect to center line track N, for example, are spaced one unit away from track center line. Thus, the magnetic head having a head width of 8 units overlaps 6 units of servo code in traversing the magnetic zones on track center. Also as the 8 unit magnetic head is displaced to the left or to the right of track center it always overlaps 6 units of servo code excepting in an extreme off center track position in which it no longer overlaps both the A and B magnetic zones.

In FIG. 13, the A and B magnetic zones have edges on the track center line N. Thus, the narrow magnetic head which is 6 units wide overlaps 6 units of servo code, both when track centered and when track off centered.

Side erasures 15 appear in the servo code of FIG. 13. As long as the magnetic head overlaps both of the side erasures, whether or not the head is track centered, servo gain is uniform. Only a slight variation in servo gain results when the head is offset from track center sufficiently to overlap only one of the side erasures 15.

Referring back to FIG. 12, the side erasures occurred at the edges of the magnetic zones A and B adjacent track center line N, N+1 and so forth. In each instance the trimming operation removed the contiguous portions of the magnetic zones.

Summarizing, head to head servo gain is minimized since each head overlaps the same amount of servo code. Additionally, there is a wide linear range of servo gain in track off center positions, since, again, the magnetic heads overlap the same amount of servo code.

In writing the servo code of FIGS. 12 and 13, the magnetic head must be positioned at four different locations. In trimming the magnetic fields, as the head traverses the magnetic zones, current must be applied to the magnetic head for one magnetic zone location, for example, to trim the A field but not for trimming the magnetic zone B. the reverse is true when trimming the magnetic zones B.

Figure 14:
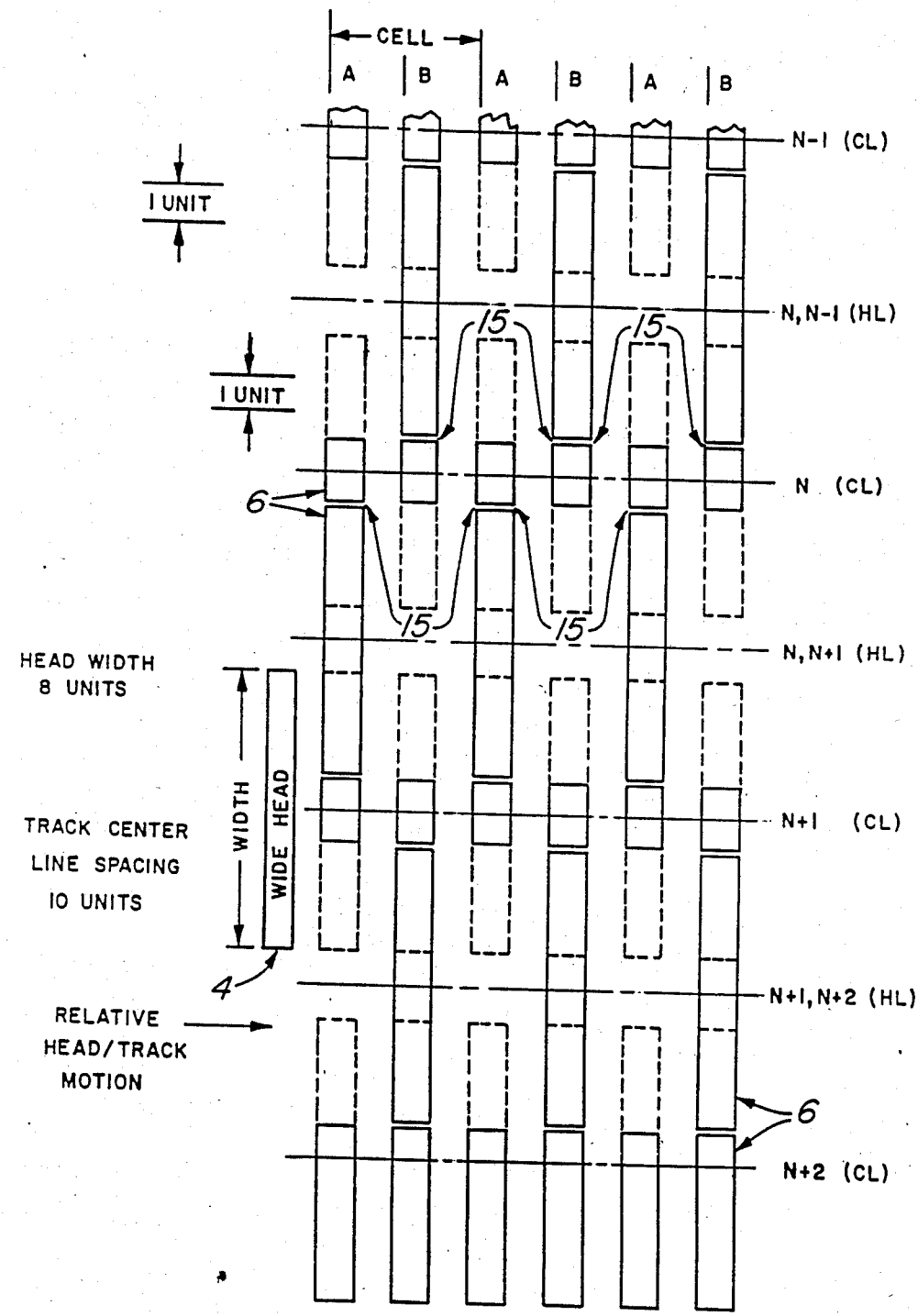
FIGS. 14 and 15 are servo code patterns written with wide and narrow magnetic heads, respectively, exhibiting an overlapping code pattern, using only two head locations in writing, in which both magnetic heads, during reading, overlap the same amount of servo code and therefore have the same servo gain.
Figure 15:
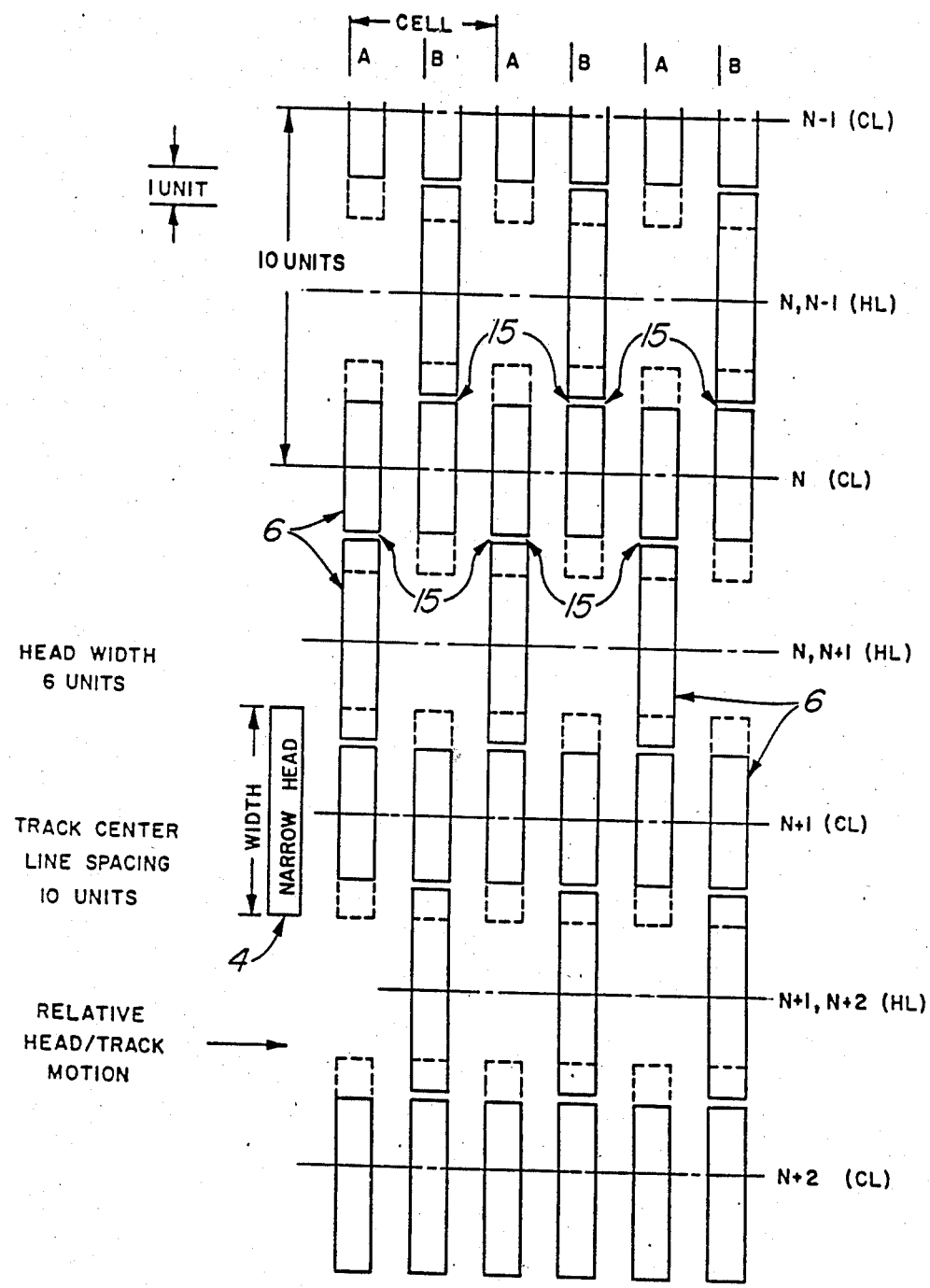

FIGS. 14 and 15, using a simpler servo writing technique than that of FIGS. 12 and 13, also provides a servo code pattern in which all of the heads overlap the same amount of servo code, and, hence, have the same servo gain. As in the previous figures, the same head that is used for writing the servo code is used for reading the servo code.

The method for writing the servo code patterns of FIGS. 14 and 15 is as follows:
1. Write magnetic zones A and B on the center line track N.

2. On the half line track N, N−1 erase the overlapping portions of magnetic zones A and write magnetic zones B.
3. Write magnetic zones A and B on center line track N+1.
4. On the half line track N, N+1 erase overlapping portions of magnetic zone B and write magnetic zone A.
5. Write magnetic zones A and B on center line track N+2.
6. On the half line track N+1, N+2 erase the overlapping portion of magnetic zone A and write magnetic zone B.
7. Continue this sequence until all of the servo code tracks are written.

In writing this servo code, only two magnetic head locations per track to be written are required. There is no requirement for write current gating, as in the trimming operations of FIGS. 12 and 13, and all of the track centers for wide and narrow heads are aligned.

Figure 16:
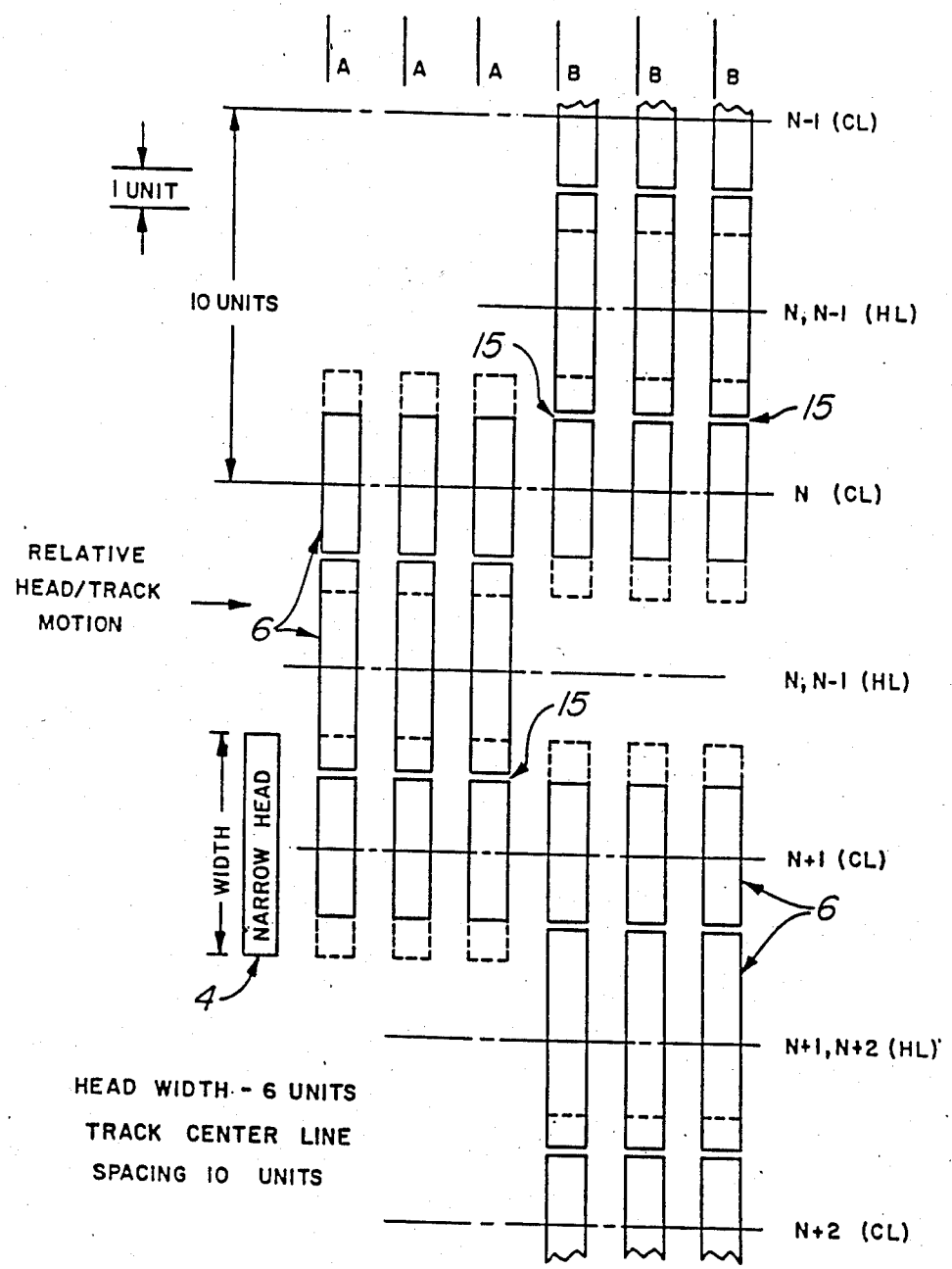
FIG. 16 illustrates a different way of formatting the servo code of FIG. 15.

FIG. 16 is an alternative servo code pattern based upon the servo code pattern of FIG. 15. This is the servo code which is written by the narrow head. In this arrangement instead of alternating the magnetic fields which write the magnetic zones A and B, magnetic zones A are written and then magnetic zones B are written. Three such zones in each sequence are illustrated in FIG. 15. The servo code overlap is the same as that in the previous FIG. 14. Likewise the servo code seen by the narrow head during a reading operation is the same. Thus, the head to head variation in servo gain is also minimized with the offset.

FIGS. 17 and 18 illustrate the servo code pattern of FIGS. 14 and 15 for wide and narrow heads in an actual application. The standard core width of a typical magnetic head is 450 μin. core width. Tolerance is ±75 μin. The fringing field is 100 μin. on this actual head.

The track to track spacing equals 650 μin.

The wide head equals 450+75+100=625 μin. The narrow head equals 450−75+100=475 μin. The code pattern scale, 50 μin., is indicated on the drawings.

With a wide head, the servo code overlap between the magnetic zones A and B at the track center is about 25 μin, thus the linear range in track offset positions of the wide magnetic head is ±300 μin.

The narrow head is 475 μin. wide, the magnetic zone overlap on the servo code at track center is 175 μin. Thus with the narrow head, the linear range of servo gain in track offset positions is ±150 μin.

Write current variations, in writing the magnetic zones in all of the servo code patterns described, may be employed in further minimizing servo gain variations. The required write current across the disc is empirically determined and used during writing of the servo code. One approach in making this empirical determination is to determine a range of write currents providing optimum servo gain for a distribution of available magnetic heads.

Figure 19:
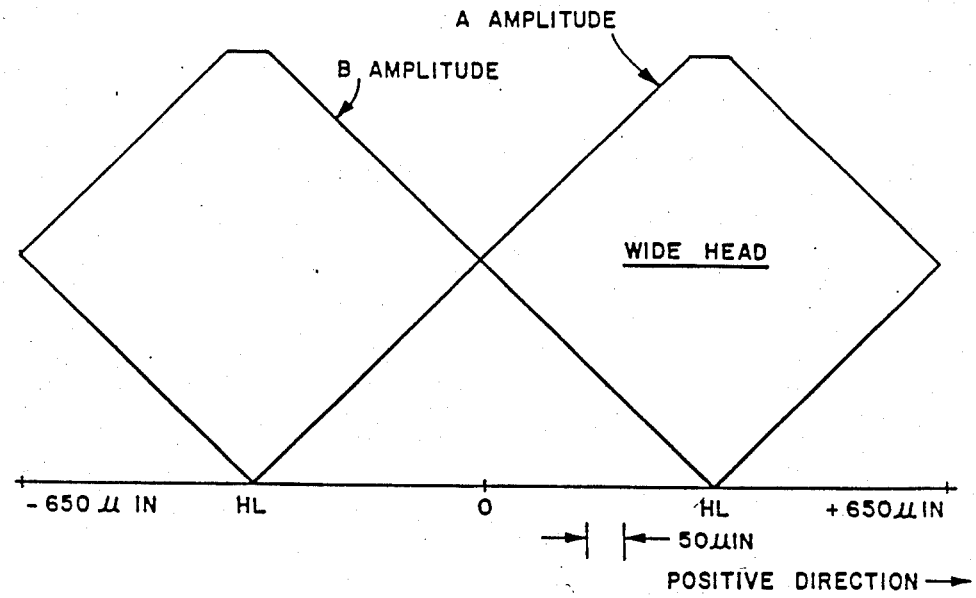
FIGS. 19 and 20 are plots of voltages induced in the wide magnetic head and the narrow magnetic head of FIGS. 17 and 18 respectively, in off center positions on both sides of the track.
Figure 20:
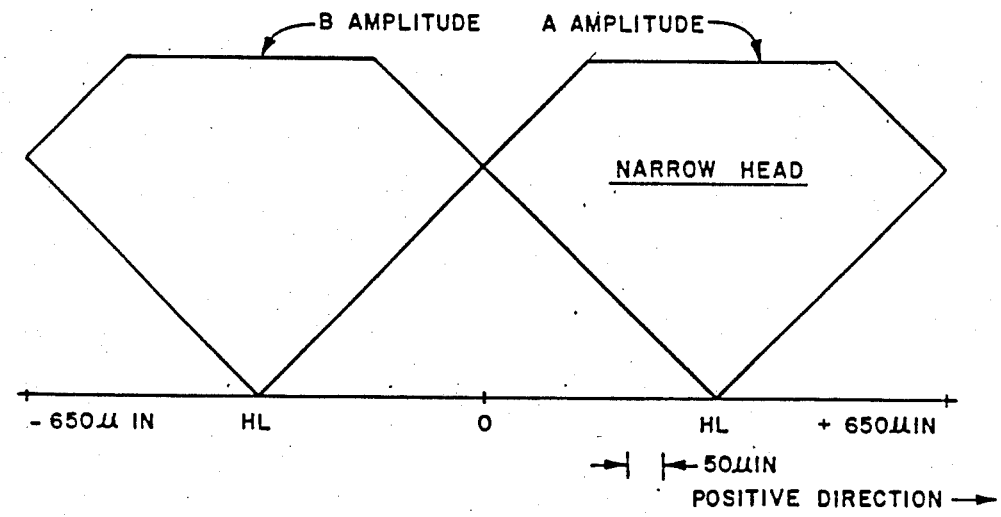

The linear ranges of the magnetic fields as seen by the wide and narrow magnetic heads of FIGS. 17 and 18 are plotted in FIGS. 19 and 20 respectively. The scale used here is the same as that used in FIGS. 17 and 18. These plots are idealized. Actual voltages induced in the magnetic heads in the indicated track offset positions would be rounded in the upper corners of these plots.

Figure 21:
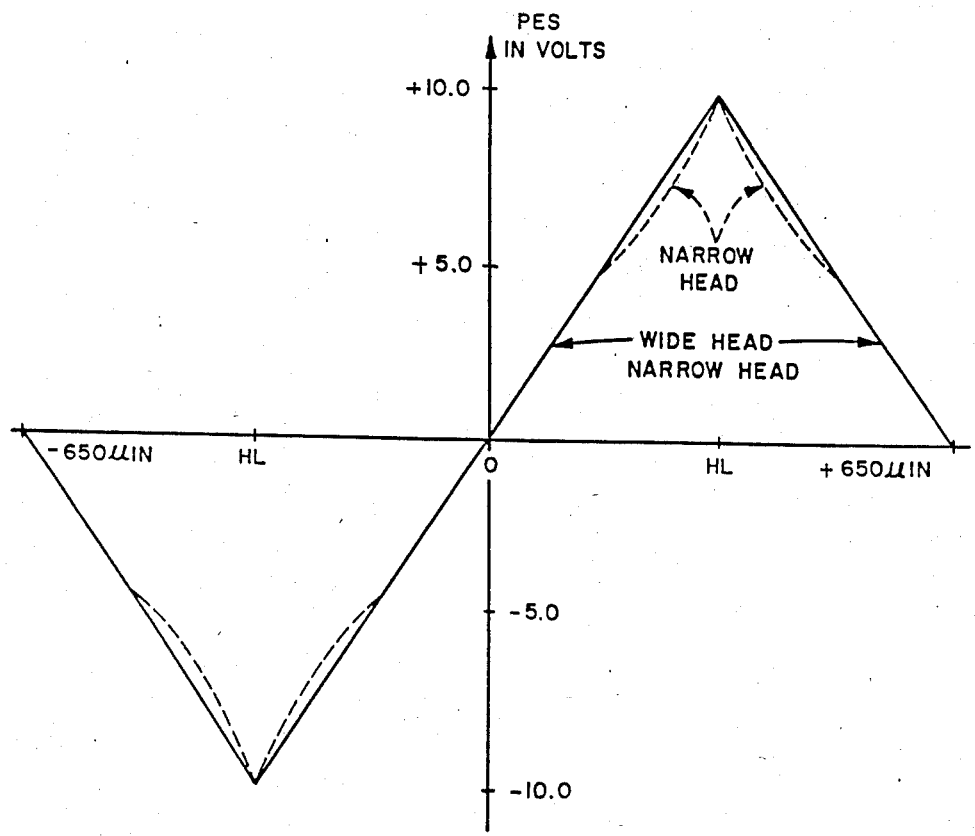
FIG. 21 is a position error signal plot for both of the heads.

The position error signal plot is shown in FIG. 21. This, too, is plotted to the same scale as FIGS. 17 and 18 and shows the position error signal for both the wide head and the narrow head.

1. The automatic gain control (AGC) is such that $(A+B)*K = 10$ volts.
2. Then the position error signal PES equals $K*(A-B)$. Therefore, $PES = [10v(A-B)/(A+B)]$
3. Servo gain is the first derivative, i.e., slope, of the position error signal (PES) with respect to position.

In the expressions above, A and B represent the fields or voltages induced in the magnetic heads by the magnetic fields of the A and B magnetic zones in the servo code. The voltage plots in FIG. 21 are idealized and assume that the AGC is operating over the voltage amplitude. The position error signals are superimposed for about ½ of the track offset position in each direction. Beyond this point, the signal plot of the narrow head shown in dotted line digresses from the signal plot of the wide head. However, this digression is slight, in most applications will not require external servo gain compensation circuits and is beyond the usual field of interest.

Figure 22:
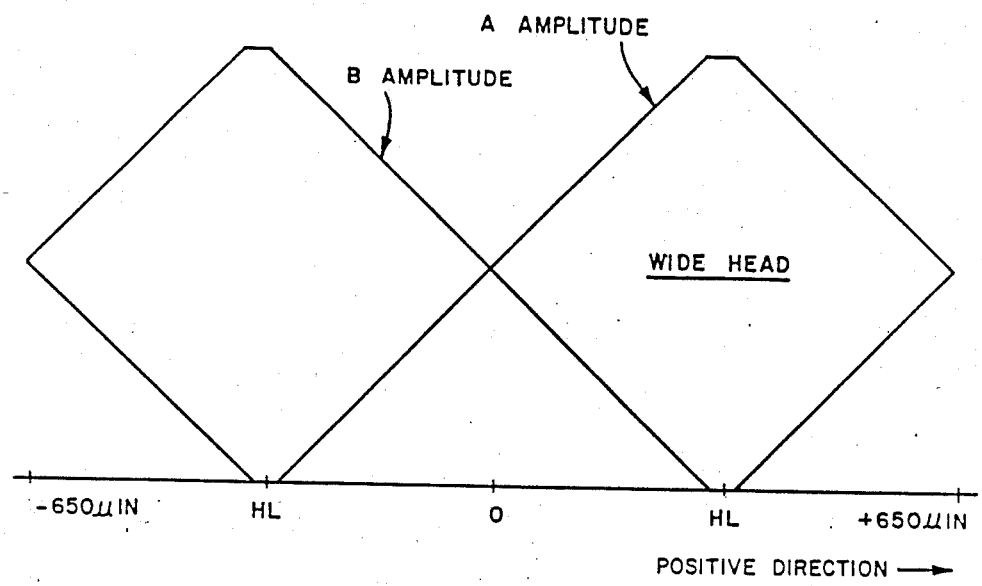
FIGS. 22 and 23 are plots of voltages induced in the respective magnetic heads of FIGS. 10 and 11 for differing track off center positions on both sides of the track, for comparison with FIGS. 19 and 20.
Figure 23:
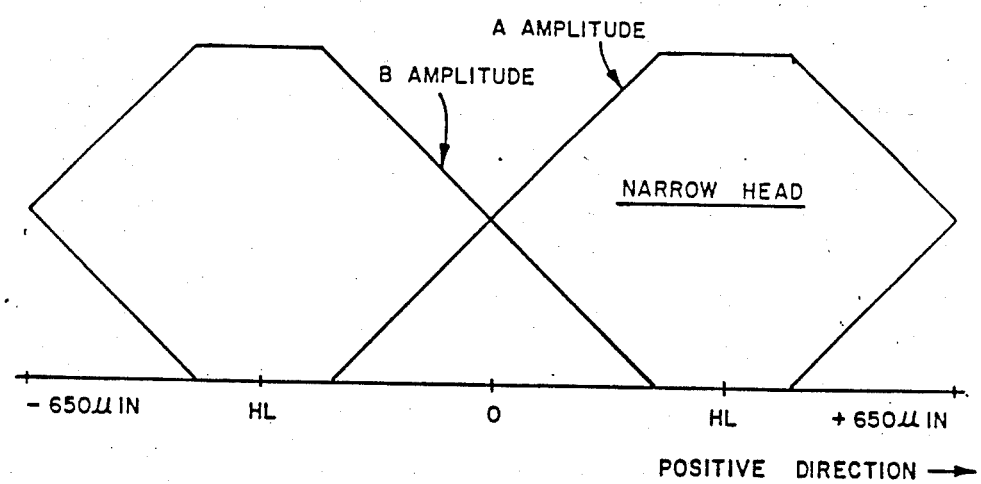

FIGS. 22 and 23 for comparison plot the amplitudes of the A and B fields for the servo code patterns of FIGS. 10 and 11 respectively. Although the servo code patterns of FIGS. 10 and 11 provide improved linear ranges in track offset positions, the linear range on each side of track center is less than that afforded by the servo code patterns of FIGS. 17 and 18.

Figure 24:
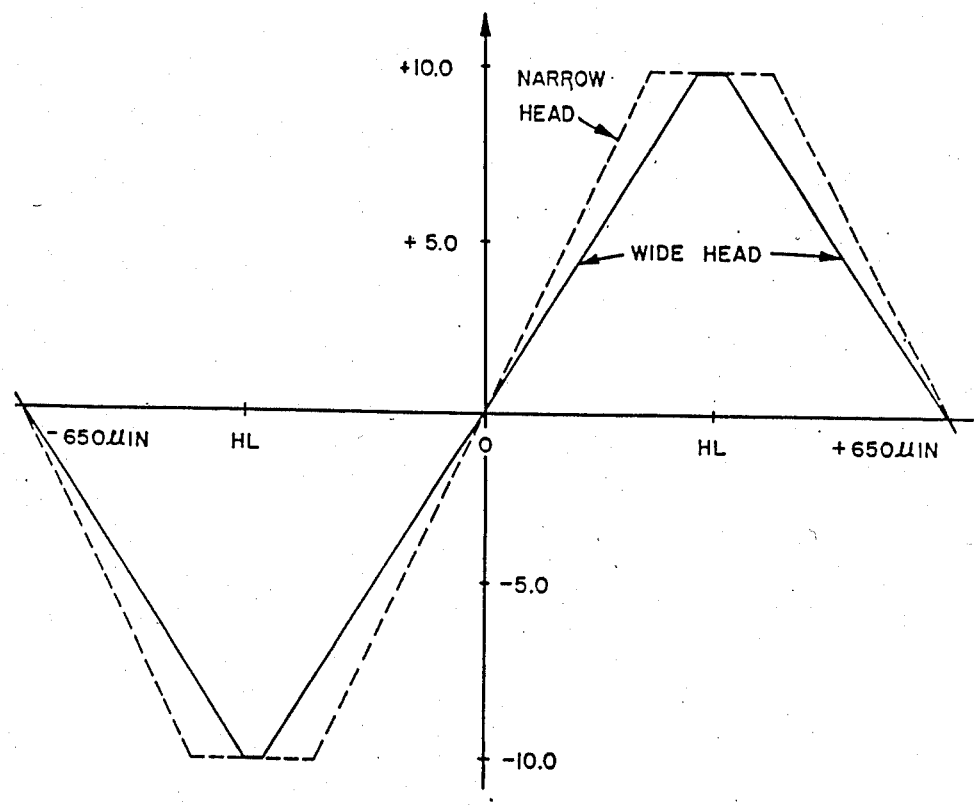
FIG. 24 is a position error signal plot for the two heads of FIGS. 10 and 11 for comparison with FIG. 21.

Finally, for further comparison the position error signals (PES) are plotted in FIG. 24. Here, again, the narrow head is shown in dotted line. Unlike the plot of FIG. 20, these signals digress throughout their range. The different slopes at track center clearly show the different servo gains for each head. These differences fall within usable ranges but are not as good as those of FIG. 21.

In the interest of simplicity in describing this invention only two phases of servo code have been used. It will be appreciated, however, that the principles of this invention are equally applicable in developing patterns of more than two phases of servo code per track cell.

Head-to-head variations in servo gain are minimized using servo code in which magnetic heads of differing widths overlap the same amount of servo code and servo gain variation as a function of track offset of the magnetic heads is minimized by maintaining the same overlap of the servo code by the magnetic head in differing track offset positions, within limits. Substantially constant servo gain exists in track offset positions of substantially one half of the track width in each direction of offset.

INDUSTRIAL APPLICABILITY

These magnetic servo code patterns are useful in all magnetic disc drives.

What is claimed is:

1. A magnetic disc memory drive in which individual magnetic heads exhibit substantially the same servo gain, comprising:
   a. a plurality of rotatable magnetic memory discs each having a surface of magnetic material;
   b. a movable magnetic head assembly, including individual magnetic heads of differing widths, for moving each magnetic head substantially radially over an adjacent disc surface; and
   c. magnetic servo code recorded by the individual magnetic heads in tracks on said magnetic memory discs in servo code patterns in which each magnetic head overlaps substantially the same amount of magnetic servo code for minimizing variations in servo gain among the heads.

2. The invention according to claim 1, in which:
   a. A and B phases of servo code are recorded on opposite sides of each of said tracks; and
   b. each magnetic head overlaps substantially the same amount of magnetic servo code when in track centered position.

3. The invention according to claim 2, in which:
   a. the magnetic heads each overlap substantially the same amount of servo code up to substantially onehalf track of magnetic head offset.

4. The invention according to claim 2, in which:
   a. the overlap of servo code by each magnetic head does not change at least until a magnetic head overlaps only one phase of said servo code.

5. The method of writing magnetic code along tracks on a magnetic memory disc using a magnetic head, comprising:
   a. coupling write current to said magnetic head;
   b. using said magnetic head to record magnetic zones along alternate first tracks in spaced positions along said tracks and aligned with one another across said tracks;
   c. using said magnetic head to record magnetic zones along alternate second tracks intermediate said first tracks on said discs in spaced positions along said second tracks intermediate said magnetic zones on said first tracks and aligned with one another across said second track;
   d. said magnetic zones having a width substantially the same as the distance between said first and second tracks;
   e. using said magnetic head to record magnetic zones on half tracks intermediate said first and second tracks and on one side only of said first tracks, aligned with and overlapping the magnetic zones along said one side of said first tracks and to erase overlapping portions of magnetic zones along and on one side of said second tracks; and
   f. using said magnetic head to record magnetic zones along remaining half line tracks on one side only of said second track, aligned with and overlapping the magnetic zones along said one side of said second track and to erase overlapping portions of the magnetic zones along said first tracks and on the side opposite said one side of said first tracks.

6. The method according to claim 5, in which:
   a. said magnetic head is used to write said magnetic zones along a first track and then to write magnetic zones along a second track in repeating track sequence.

7. The method according to claim 6, in which:
   a. said magnetic head is used to write said magnetic zones overlapping portions of magnetic zones on said one side of a first track and to erase said overlapping portions of magnetic zones on a second track, and, thereafter to write said overlapping portions of magnetic zones on said one side of a second track and to erase said overlapping portions of magnetic zones along a first track, in repeating track sequence.

8. The method of writing servo code along center line tracks N; N+1; N+2; N+3; etc., and half line tracks N, N+1; N+1, N+2; and N+2, N+3; on a magnetic memory disc using a magnetic head, comprising:
   a. coupling write current to said magnetic head;
   b. using said magnetic head to write magnetic zones along track N, in spaced positions along said track N;
   c. using said magnetic head to write magnetic zones along track N+1 in spaced positions along said track N+1 which are intermediate positions of the magnetic zones on said track N;
   d. using said magnetic head to write magnetic zones along track N+2 in spaced track positions aligned with the magnetic zones of said track N;
   e. using said magnetic head to write magnetic zones along track N+3 in spaced positions along track N+3 aligned with the positions of the magnetic zones on said track N+1;
   f. using said magnetic head to write magnetic zones on half line track N, N+1 in positions overlapping portions of the magnetic zones of said track N and to erase overlapping portions of the magnetic zones of said track N+1;
   g. using said magnetic head to write magnetic zones in spaced positions along half line track N+1, N+2 in positions overlapping portions of the magnetic zones of track N+1 and to erase overlapping portions of magnetic zones of said track N+2; and
   h. using said magnetic head to write magnetic zones along half line track N+2, N+3 in positions overlapping portions of the magnetic zones of said track N+2 and to erase overlapping portions of magnetic zones of said track N+3.

9. The method of writing magnetic servo code along center line and half line tracks in the surface of a magnetic memory disc using a magnetic head having a width substantially the same as the spacing between center line tracks, comprising:
   a. coupling write current to said magnetic head;
   b. using said magnetic head to write magnetic zones in spaced positions along a first half line track;
   c. using said magnetic head to write magnetic zones along a first center line track in spaced positions aligned with and overlapping said magnetic zones on said first half line track;
   d. using said magnetic head to write magnetic zones along a second half line track adjacent said first center line track, in spaced positions along said second half line track intermediate said magnetic zones on said first center line track, and, to erase overlapping portions of magnetic zones on said first center line track;
   e. using said magnetic head to write magnetic zones along a second center line track in spaced positions aligned with and over lapping magnetic zones along said second half line track; and
   f. repeating the sequences of paragraphs b, c, d and e in writing magnetic zones along additional half line and center line tracks.

10. The method of writing magnetic servo code on a plurality of equally spaced tracks using a magnetic head and having a width such that magnetic zones in adjacent tracks overlap, comprising:
   a. coupling write current to said magnetic head;
   b. using said magnetic head to write magnetic zones in spaced positions along a first track;
   c. using said magnetic head to write magnetic zones along a second track adjacent said first track, in positions intermediate said magnetic zones along said first track and to erase overlapping portions of said magnetic zones along said first track;

d. using said magnetic head to write magnetic zones along a third track adjacent said second track in positions aligned with and overlapping portions of magnetic zones along said second track;

e. using said magnetic head to write magnetic zones along a fourth track adjacent said third track, in positions intermediate the magnetic zones along said third track, and to erase over lapping portions of said magnetic zones along said third track;

f. using said magnetic head to write magnetic zones along a fifth track in positions aligned with and overlapping portions of magnetic zones along said second track; and g. repeating the sequences of paragraphs b, c, d, e and f in writing magnetic zones on succeeding tracks.

11. The method of writing magnetic servo code on a plurality of equally spaced tracks using a magnetic head having a width such that magnetic zones in adjacent tracks overlap, comprising:

a. coupling write current to said magnetic head;

b. using said magnetic head to write magnetic zones in spaced positions along a first track;

c. using said magnetic head to write magnetic zones along a second track adjacent said first track in positions aligned with and over lapping portions of magnetic zones along said second track;

d. using said magnetic head to write magnetic zones along a third track adjacent said second track, in positions intermediate the magnetic zones along said second track and to erase overlapping portions of said magnetic zones along said second track;

e. using said magnetic head to write magnetic zones along a fourth track in positions aligned with and over lapping portions of magnetic zones along said third track; and f. repeating the sequences of paragraphs b, c, d and e in writing magnetic zones on succeeding tracks.

12. In a disc drive, a magnetic disc having servo code thereon comprising:

a. a magnetic disc having a surface of magnetizable material;

b. aligned and overlapping magnetic zones in spaced positions along a first pair of adjacent circular tracks in said surface;

c. aligned and overlapping magnetic zones in spaced positions along a second pair of adjacent circular track in said surface, which second pair of circular tracks is adjacent said first pair of circular tracks, and in which said aligned magnetic zones along said second pair of circular track occupy positions in said surface intermediate the positions of the magnetic zones of said first pair of circular tracks; and d. the adjacent edges of the magnetic zones of said first pair and of said second pair of circular tracks define a circular servo track therebetween.

13. The invention according to claim 12, in which:

a. the overlapping magnetic zones of said first pair of circular tracks and the overlapping magnetic zones of said second pair of circular tracks are arranged in spaced groups of at least two magnetic zones in each group and said groups of magnetic zones along said second pair of circular tracks occupy positions in said surface intermediate the groups of magnetic zones of said first pair of circular tracks.

14. The method of writing servo code on a magnetic disc which minimizes magnetic head-to-magnetic head servo gain variations among a group of magnetic heads in a disc drive, wherein each disc has a magnetic head for writing and reading, comprising:

a. coupling write current at different times to each magnetic head;

b. on each disc using the magnetic head thereat to write spaced magnetic zones along a track;

c. on each disc using the magnetic head thereat to write magnetic zones individually overlapping alternate magnetic zone portions and to erase remaining alternate magnetic zone portions overlapped by the magnetic head on one side of said track;

d. on each disc using the magnetic head thereat in positions displaced on each side of said track one-half the width of the narrowest magnetic head of said group of magnetic heads to erase additional portions of said remaining alternate magnetic zone portions on said one side of said track, and, on the opposite side of said track from said one side to erase alternate magnetic zone portions;

e. on each disc using the magnetic head thereat to write spaced magnetic zones along a second track;

f. on each disc on a track line intermediate said first track and said second track using the magnetic head thereat to write magnetic zones which individually overlap alternate magnetic zone portions on said second track different from the alternate magnetic zone portion overlapped on said first track and erasing the remaining alternate magnetic zone portions on said one side of said second track; and g. on each disc using the magnetic head thereat in positions displaced on each side of said second track one-half the width of the narrowest magnetic head of said group of magnetic heads to erase additional portions of said remaining alternate magnetic zone portions on said one side of said second track and, on the opposite side of said second track from said one side to erase different alternate magnetic zone portions.

15. The method of writing servo code on a magnetic disc which minimizes magnetic head-to-magnetic head servo gain variations among a group of magnetic heads in a disc drive, wherein each disc has a magnetic head for writing and reading, comprising:

a. coupling write current at different times to each magnetic head;

b. on each disc using the magnetic head thereat to write spaced magnetic zones along a first track;

c. on each disc along a half track spacing on one side of said first track, using the magnetic head thereat to write magnetic zones overlapping portions of alternate magnetic zones along said first track and for erasing portions of the remaining alternate magnetic zones along said first track, overlapped by the magnetic head;

d. on each disc along a track spaced one track width from the side of said first track opposite said one side, using the magnetic head thereat to record magnetic zones aligned with the magnetic zones along said first track;

e. on each disc along a half line track intermediate said first and said second tracks, using the magnetic head thereat to write magnetic zones overlapping alternate magnetic zones of said first track portions of which, on said one side of said first track, were erased, and, overlapping aligned portions of alternate magnetic zones of said second track and erasing the remaining alternate portions of magnetic zones on said side of said first track opposite said one side and on said one side of said second track; and f. repeating the sequences of paragraphs b, c, d and e in recording magnetic zones on succeeding tracks.

16. The method of claim 5, comprising:
a. empirically determining write current values for a particular distribution of magnetic heads to optimize magnetic zone recording for minimizing servo gain variations among the heads.

17. The method of claim 8, comprising:
a. empirically determining write current values for a particular distribution of magnetic heads to optimize magnetic zone recording for minimizing servo gain variations among the heads.

18. The method of claim 9, comprising:
a. empirically determining write current values for a particular distribution of magnetic heads to optimize magnetic zone recording for minimizing servo gain variations among the heads.

19. The method of claim 10, comprising:
a. empirically determining write current values for a particular distribution of magnetic heads to optimize magnetic zone recording for minimizing servo gain variations among the heads.

20. The method of claim 11, comprising:
a. empirically, determining write current values for a particular distribution of magnetic heads to optimize magnetic zone recording for minimizing servo gain variations among the heads.

21. The method of claim 14, comprising:
a. empirically determining write current values for a particular distribution of magnetic heads to optimize magnetic zone recording for minimizing servo gain variations among the heads.

22. The method of claim 15, comprising:
a. empirically determining write current values for a particular distribution of magnetic heads to optimize magnetic zone recording for minimizing servo gain variations among the heads.

* * * * *